United States Patent [19]
Russo et al.

[11] Patent Number: 5,226,688
[45] Date of Patent: Jul. 13, 1993

[54] SHEET CARRYING DEVICE

[75] Inventors: Laura J. Russo, 22 Gillies La., Norwalk, Conn. 06854-1013; Donald A. Daniels, Waterbury, Conn.; Gary Ahlert, Rye, N.Y.

[73] Assignee: Laura J. Russo, Norwalk, Conn.

[21] Appl. No.: 913,225

[22] Filed: Jul. 14, 1992

[51] Int. Cl.$^5$ .............................................. B65G 7/12
[52] U.S. Cl. ...................... 294/16; 294/104; 294/164; 294/168
[58] Field of Search ............. 294/15, 16, 25, 26, 294/28, 74, 101, 104, 113, 114, 149–156, 167–169; 224/202, 208, 257

[56] References Cited

U.S. PATENT DOCUMENTS

| | | | |
|---|---|---|---|
| 837,549 | 12/1906 | Dubrule | 294/114 X |
| 2,430,142 | 11/1947 | Roberts | 294/168 |
| 2,739,007 | 3/1956 | Rauterberg | 294/15 |
| 3,374,024 | 3/1968 | Reynolds | 294/16 |
| 3,377,095 | 4/1968 | Allen | 294/15 |
| 3,524,670 | 8/1970 | Ilich | 294/16 X |
| 4,013,202 | 3/1977 | Russo | 294/16 X |
| 4,190,278 | 2/1980 | Jancik | 294/26 |
| 4,280,645 | 7/1981 | Goodden | 294/25 X |
| 4,349,225 | 9/1982 | Collins et al. | 294/16 |

*Primary Examiner*—Johnny D. Cherry
*Attorney, Agent, or Firm*—John J. Daniels

[57] ABSTRACT

An improved sheet carrying device in which a frame is provided including a lower frame portion defining a plane against which a sheet of material may be placed. The lower frame portion has a lower crossbar which forms a lower lifting region and defines a curve which is effective for accommodating a leg of a user during use to facilitate walking. An upper frame portion has an upper crossbar which forms an upper lifting region and defines a curve which is effective for accommodating the shoulder of the user during use to prevent sliding of the carrying device. The lower frame portion includes a pair of extendable arms which are effective for varying the distance between the upper lifting region and the lower lifting region. A strap member is attached to the upper frame portion which is effective for supporting the carrying device around the torso of a user during use. To more securely grip a sheet of material having a smooth surface, such as glass, an embodiment of the present invention includes a planar member which is disposed in the plane against which the sheet of material is placed. The planar member has a sheet contacting surface which is effective for contacting with the surface of the sheet placed in the plane to thereby provide larger surface contact area between the inventive carrying device and the sheet being carried. At least two pairs of cams which are pivotally supported on mounting arms disposed opposite the plane against which the sheet of material is placed are effective to engage with the sheet of material.

19 Claims, 6 Drawing Sheets

PRIOR ART

Figure 6

SHEET CARRYING DEVICE

BACKGROUND OF THE INVENTION

The present invention pertains to carrying devices. More particularly, the present invention pertains to an improvement in carrying devices for lifting and carrying sheets of material.

Construction material, such as sheet-rock, plywood, or paneling, typically comes in large sheets. Moving the sheets around the construction site or from the place of purchase is a very difficult operation, especially for a single individual. This is primarily due to the awkwardness of the large sheets of material due to their size and the inability of an individual to adequately grasp and maneuver the sheet. Oftentimes, because of the awkwardness of maneuvering large sheets of material, the sheets will be damaged by being dropped or bumped into other objects. In particular, due to the fragile nature of sheet-rock, oftentimes the corners or edges of a sheet of sheet-rock material is damaged due to mishandling primarily caused by the awkwardness of handling a large sheet. This results in the sheet of sheet-rock being unusable as a full sheet.

Figure 6:
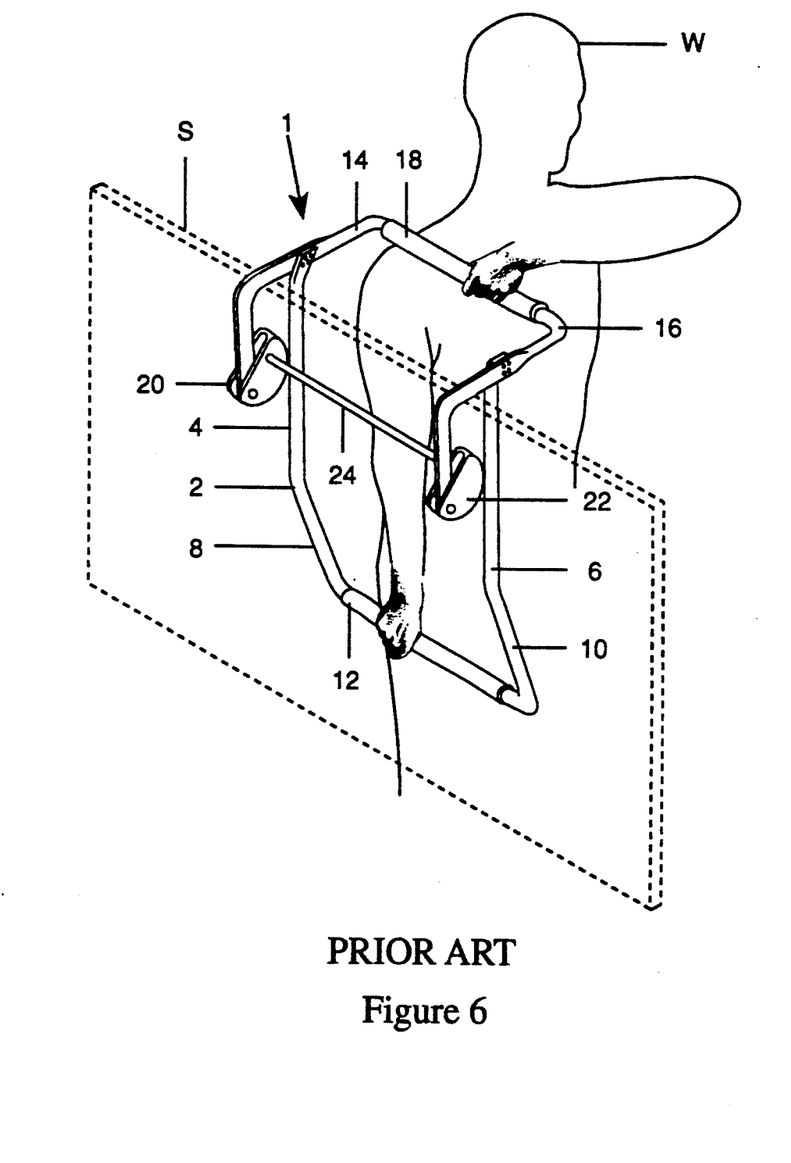
FIG. 6 is a view of a prior art sheet carrying device.

U.S. Pat. No. 4,013,202, issued to Russo, teaches a device for conveniently lifting and transporting a large sheet of material. Referring to FIG. 6, the prior art sheet carrying device 1 taught by Russo includes a substantially U-shaped frame 2. This substantially U-shaped frame 2 has parallel arms 4 and 6 and bent arms 8 and 10. Bent arms 8 and 10 are bent at an angle to a plane defined by arms 4 and 6 so as to position a crossbar 12 having a finger clearance from the surface of a sheet S when the sheet S is being gripped in this prior art device 1. The prior art sheet carrying device 1 includes side arms 14 and 16 which have a crossbar 18 disposed therebetween. Mounting arms are provided which have cams 20 and 22 rotatably supported therefrom. These cams are pivotally supported by the mounting arms adjacent to the plane formed by parallel arms 4 and 6. These cams 20 and 22 are mounted eccentrically and arranged to be rotated into a tighter gripping engagement with a sheet of material placed against the plane by the gravitational forces exerted upon the sheet as the frame is lifted. These cams are also joined for common movement by a connecting rod 24.

A worker W can lift the sheet S by holding onto the lower crossbar 12 with one hand and the upper crossbar 18 with the other. The upper crossbar 18 will rest against the shoulder of the user W. This prior art device does not provide any means for preventing the upper crossbar 18 from sliding on the shoulder, which results in difficulty of maneuvering of the sheet S.

Also, the lower crossbar 12 contacts with the user's leg when walking making walking with the sheet of material held by the prior art device 1 difficult. Also, this prior art device 1 does not provide any way to alter the length between the top crossbar 18 and the bottom crossbar 12 to accommodate workers of different heights. Furthermore, this prior art device 1 does not provide any means for adequately gripping a sheet of material having a smooth surface. Instead, the sheet is gripped between the cam 20 and 22 and the parallel arms 4 and 6 respectively.

Furthermore, the surface contact area between the cams 20 and 22 and the sheet of material is relatively small creating areas of localized compression stress where the cams contact with the sheet S. Additionally, this prior art sheet carrying device 1 requires that the worker W control and support the sheet substantially only using his arms, with the upper crossbar 18 balanced on his shoulder.

SUMMARY OF THE INVENTION

The present invention is intended to alleviate the drawbacks of the prior art. In particular, the present invention provides an improved carrying devices for carrying sheets of material.

In a preferred embodiment of the present invention, a frame is provided including a lower frame portion defining a plane against which a sheet of material may be placed. The lower frame portion has a lower crossbar which forms a lower lifting region and an upper frame portion joined to the lower frame portion which has a pair of mounting arms disposed opposite the plane. The upper frame portion also has an upper crossbar which forms an upper lifting region. The upper and lower crossbars are offset from the plane on one side thereof. Also, the lower crossbar which forms the lower lifting region defines a curve which is effective for accommodating a leg of a user during use to facilitate walking when using the carrying device for carrying a sheet of material. Also, preferably the upper crossbar which forms the upper lifting region defines a curve which is effective for accommodating the shoulder of the user during use to prevent sliding of the carrying device relative to the shoulder and to maximize comfort.

In accordance with the present invention, the lower frame portion includes a pair of extendable arms which are effective for varying the distance between the upper lifting region and the lower lifting region. Thus, users of different heights may be accommodated by adjusting the distance between the upper lifting region and the lower lifting region depending on, for example, the individual's arm length. Also, in accordance with the present invention a strap member is attached to the upper frame portion which is effective for supporting the carrying device around the torso of a user during use. The strap member distributes the weight of the sheet of material along the user's torso thus making it easier for the user to carry the sheet of material and takes weight off of the user's arms as compared with the prior art device.

In accordance with the present invention, and in particular to more securely grip a sheet of material having a smooth surface, such as glass, an embodiment of the present invention includes a planar member which is disposed in the plane against which the sheet of material is placed. This planar member has a sheet contacting surface which is effective for contacting with the surface of the sheet placed in the plane to thereby provide a large surface contact area between the inventive carrying device and the sheet being carried. This planar member is also therefore effective to lessen the localized compression forces exerted on the sheet between the cams and the frame.

Improved gripping means are provided for gripping a sheet of material comprising at least two pairs of cams which are pivotally supported on mounting arms disposed opposite the plane against which the sheet of material is placed. These pairs of cams are effective to engage with the sheet of material placed against the plane and rotate into tighter gripping engagement with the sheet of material by gravitational forces exerted on the sheet of material as the frame is lifted upwardly. The additional pair of pairs of cams better distributes the compression forces exerted on the sheet of material, which is of particular importance with regard to relatively fragile material such as sheet-rock. Also, the additional cams further improve upon the overall grip on the sheet of material thus lessening the chance that the material will slip and become damaged. Also, a connecting member connects each pair of cams for tandem motion. Furthermore, in accordance with the present invention, a tie-bar may be provided which joins each connecting member and is ineffective to promote tandem motion of all the cams.

The gripping means, in accordance with the present invention, may further include biasing means for biasing each cam in the same direction of rotation when it is being rotated due to the gravitational forces exerted on the sheet of material as the frame is lifted upwardly. This biasing means, which may be a tension or compression spring, or other spring means, applies an urging force on each of the cams to urge each cam into contact with the sheet of material and substantially improves upon the gripping action of the gripping means.

DETAILED DESCRIPTION OF THE INVENTION

For purposes of promoting an understanding of the principles of the invention, reference will now be made to the embodiments illustrated in the drawings and specific language will be used to describe the same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

Figure 1:
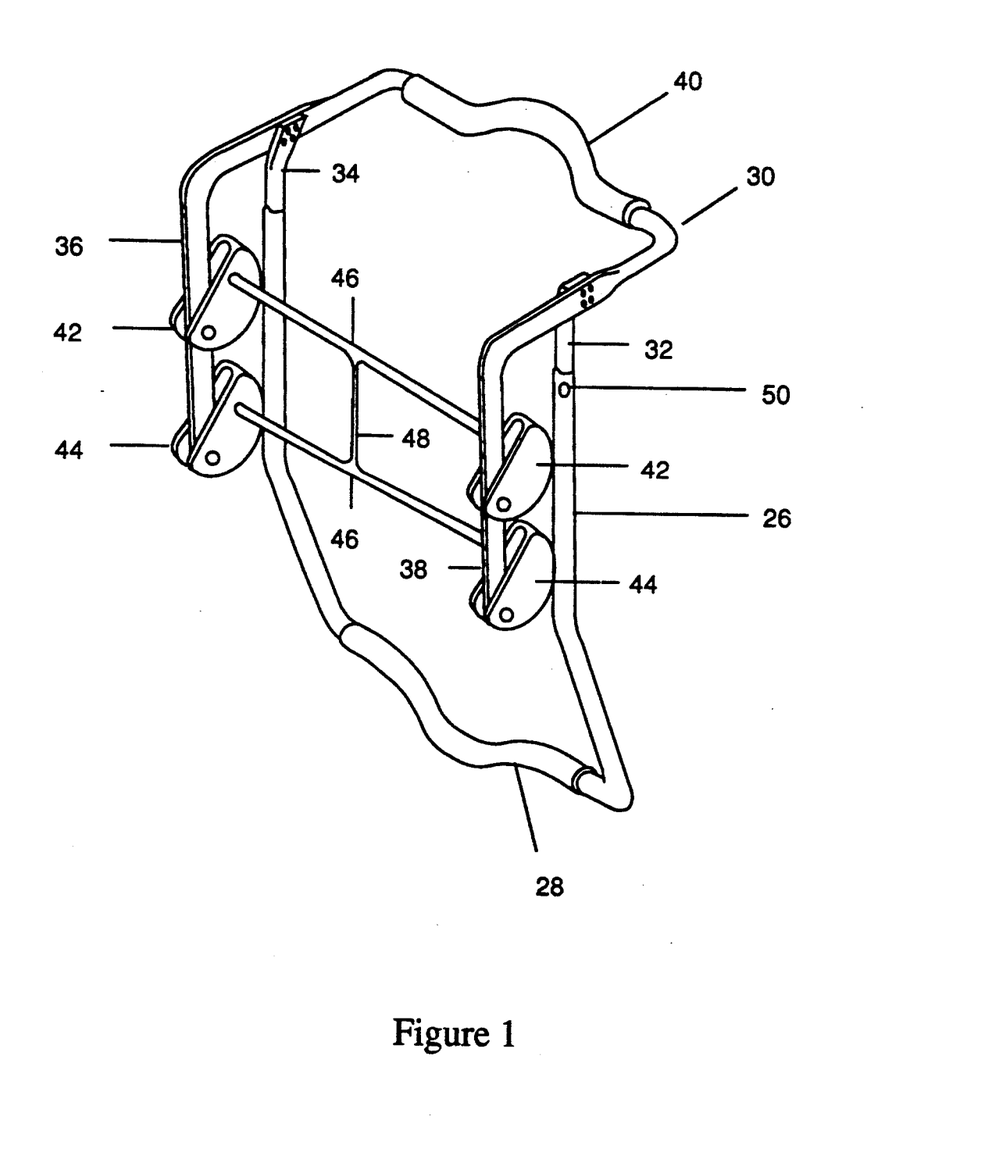
FIG. 1 is a perspective view of the preferred embodiment of the inventive improved sheet carrying device.

Referring to FIG. 1, the inventive sheet carrying device for carrying sheets of material is shown. The inventive sheet carrying device includes a lower frame portion 26 which defines a plane against which a sheet of material may be placed. The lower frame portion 26 has a lower crossbar 28 which forms a lower lifting region. The frame also an upper frame portion 30 which is joined to the lower frame portion 26 by extendable arms 32 and 34. The frame may be constructed, for example, from tubular stock metal which is bent so as to form the respective upper frame portion 30 and lower frame portion 26. The upper frame portion 30 may be attached to the lower frame portion 26 through the use of rivets, screws, or other fastening devices. Alternatively, the device may be constructed out of any suitable material such as plastic, wood, or the like.

The upper frame portion 30 has a pair of mounting arms 36 and 38 which are disposed opposite the plane. The upper frame portion 30 also has an upper crossbar 40 which forms an upper lifting region. The lower and upper crossbars 28 and 40 are offset from the plane on one side thereof to facilitate use of the inventive sheet carrying device as will be described with reference to FIG. 3. Gripping means are provided for gripping a sheet of material which is placed in the plane. The gripping means includes at least two pairs of cams 42 and 44 which are pivotally supported on the mounting arms 36 and 38 and are effective to engage with a sheet of material placed against the plane. Thus, the localized contact between the cams 42 and 44 and the surface of the sheet is spread out over a larger surface area as compared with the use of a single pair of cams 42 and 44. This is of particular importance when the material being carried is susceptible to damage due to cracking or compression, such as is the case of sheet-rock. In other words, the use of at least two pairs of cams 42 and 44 is effective for distributing the localized pressure forces experienced by the sheet being carried so as to prevent damage thereto. Also, the use of at least two pairs of cams 42 and 44 improves the gripping action of the gripping means as compared with the prior art and prevents damage which may occur if a sheet happens to slip from the grip of the cams 42 and 44. The cams 42 and 44 are rotatably supported on the mounting arms 36 and 38 so as to be effective to rotate into tighter gripping engagement with the sheet of material disposed between the cams 42 and 44 and the plane. As the frame is lifted upwardly by a user, gravitational forces exerted on the sheet material urge the cams 42 and 44 downward thus creating greater frictional forces between the cams 42 and 44 and the sheet material. A connecting member 46 connects each pair of cams 42 and 44 for tandem motion and is also used to release the sheet material from the grip of the cams 42 and 44 by pulling the connecting member 46 upwards. Also, the gripping means further includes a tie-bar 48 which joins each of the respective connecting members 46 of each pair of cams 42 and 44 together and is effective to promote tandem motion of all the cams 42 and 44. This tie-bar 48 also has an effect of stabilizing the cams 42 and 44 and further enhances the gripping action of the gripping means.

In the preferred embodiment, the lower crossbar 28 which forms the lower lifting region defines a curve which is effective for accommodating a leg of a user during use of the carrying device. Also, the upper crossbar 40 which forms the upper lifting region may define a curve which is effective for accommodating a shoulder of a user during use of the carrying device (discussed further with regard to FIG. 3). The lower frame portion 26 includes two extendable arms 32 and 34 which connect the lower frame portion 26 to the upper frame portion 30. The extendable arms 32 and 34 may be lengthened so as to vary the distance between the upper lifting region and the lower lifting region. In this way, the inventive sheet carrying device may be comfortably used by users of different height. For example, a tall user will have a relatively longer distance between his shoulder and the end of his arm while a shorter user will have a relatively shorter distance. Thus, the extendable arms 32 and 34 are provided for accommodating the differences in height. The extendable arms 32 and 34 may be telescoping and locked into position by locking means which may comprise a spring biased button 50 which protrudes through a hole and is effective for locking the extendable arms 32 and 34 in a selected position. The locking means may also comprise clamps or the like which are effective for locking the extendable arms 32 and 34 in a selected position.

Figure 2:
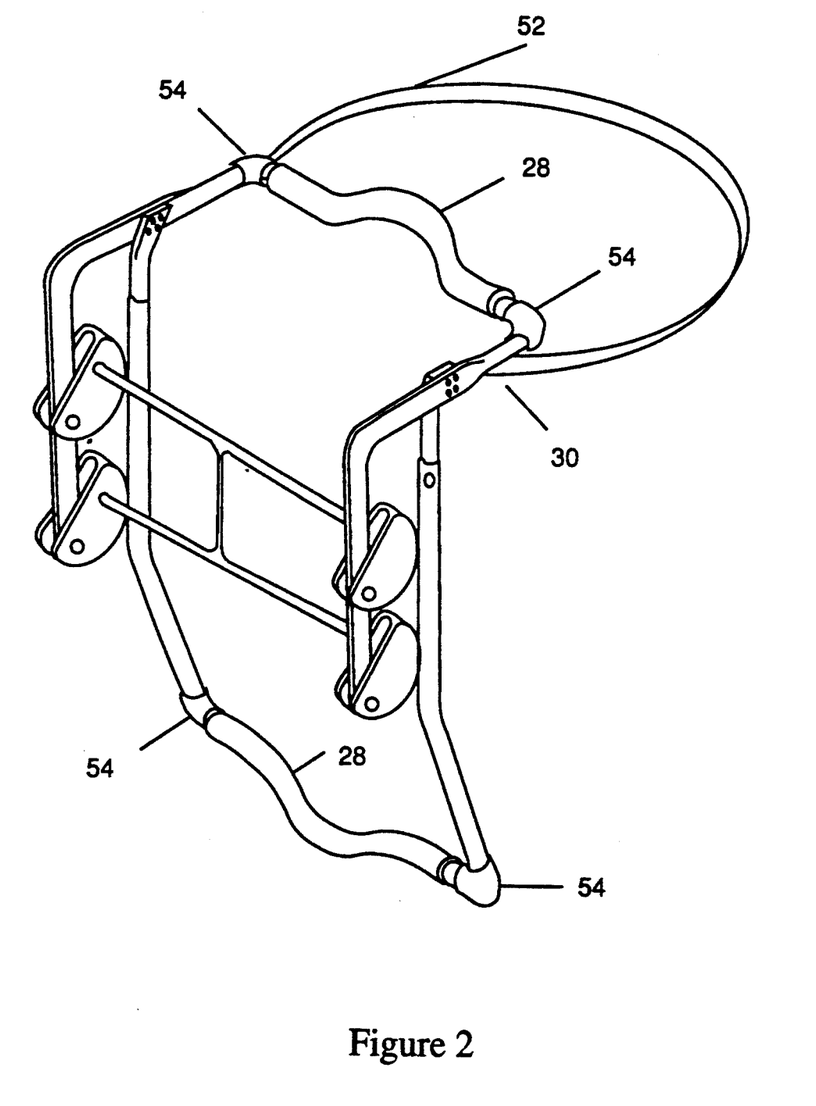
FIG. 2 is a perspective view of the preferred embodiment of the inventive sheet carrying device shown in FIG. 1, having a strap member attached.

As shown in FIG. 2, the inventive sheet carrying device may further comprise a strap member 52 which is attached to the upper frame portion 30 and which is effective for supporting the carrying device around the torso of a user during use of the carrying device. Also, hand grips 54 may be disposed at the corner positions of the upper and lower crossbars 40 and 28.

Figure 3:
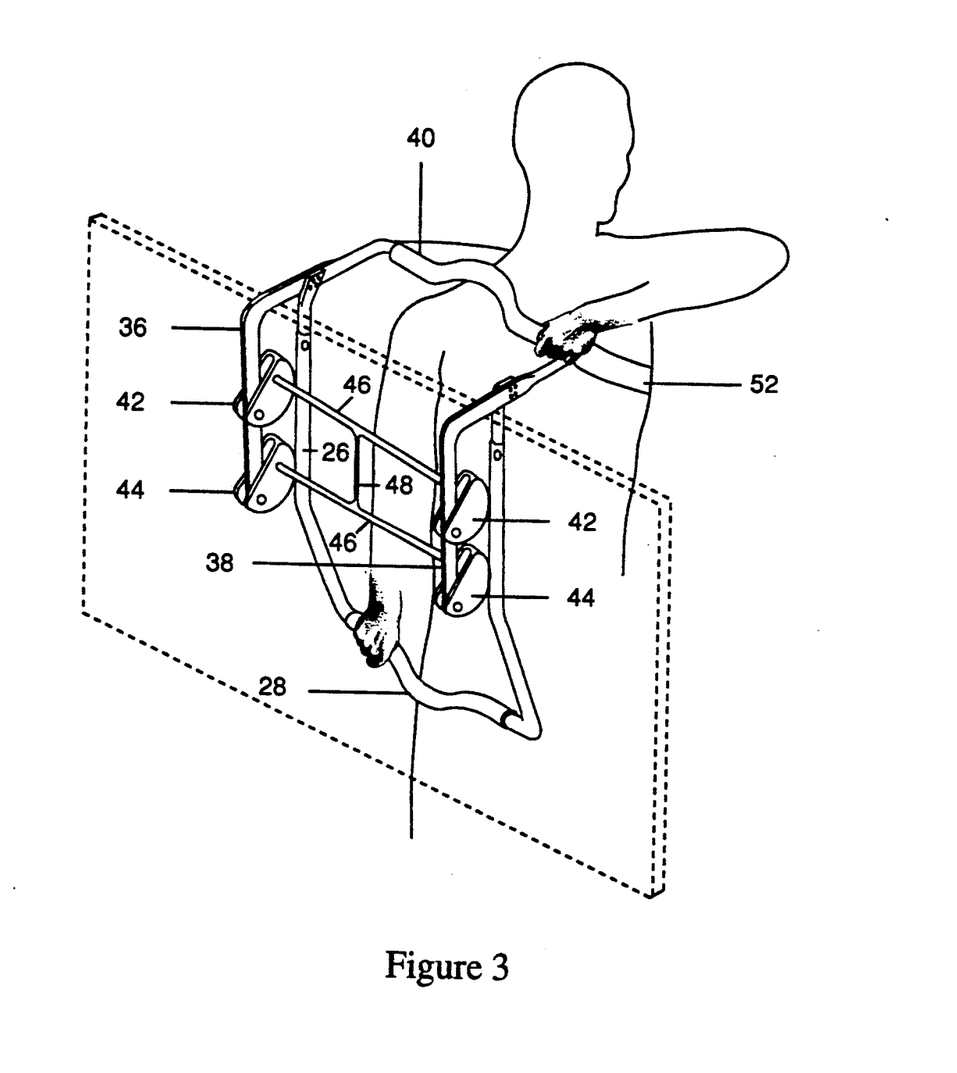
FIG. 3 is a perspective view of the embodiment of the inventive sheet carrying device shown in FIG. 2 shown in use.

Referring now to FIG. 3, the inventive sheet carrying device is shown in use. A sheet S of material is placed against the plane defined by the lower frame portion 26. As the sheet S is being placed against the plane, the cams 42 and 44 are urged upward to accept the sheet of material. When the user lifts the frame, the sheet of material is urged downward by the force of gravity. This causes the cams 42 and 44 to rotate about their pivot point or attachment with the mounting arms 36 and 38, causing the grip exerted between the cams 42 and 44 and the lower frame portion 26 to become tighter as the cams 42 and 44 are urged in a downward direction. The cams 42 and 44 are interconnected by the connecting members 46 and the tie-bar 48 so that tandem motion of all the cams 42 and 44 is promoted. The shoulder accommodating curve of the upper crossbar 40 may be padded. This shoulder accommodating curve prevents the upper frame from sliding over the shoulder and helps to stabilize the inventive sheet carrying device while in use. Also, the leg accommodating curve at the lower crossbar 28 may be padded. This leg accommodating curve allows the user to comfortably grip the lower crossbar 28 and still walk easily while carrying the sheet of material. Further, the strap member 52 is disposed around the torso of the user so that the user does not have to rely on the strength of his arms alone to carry the material.

Figure 4:
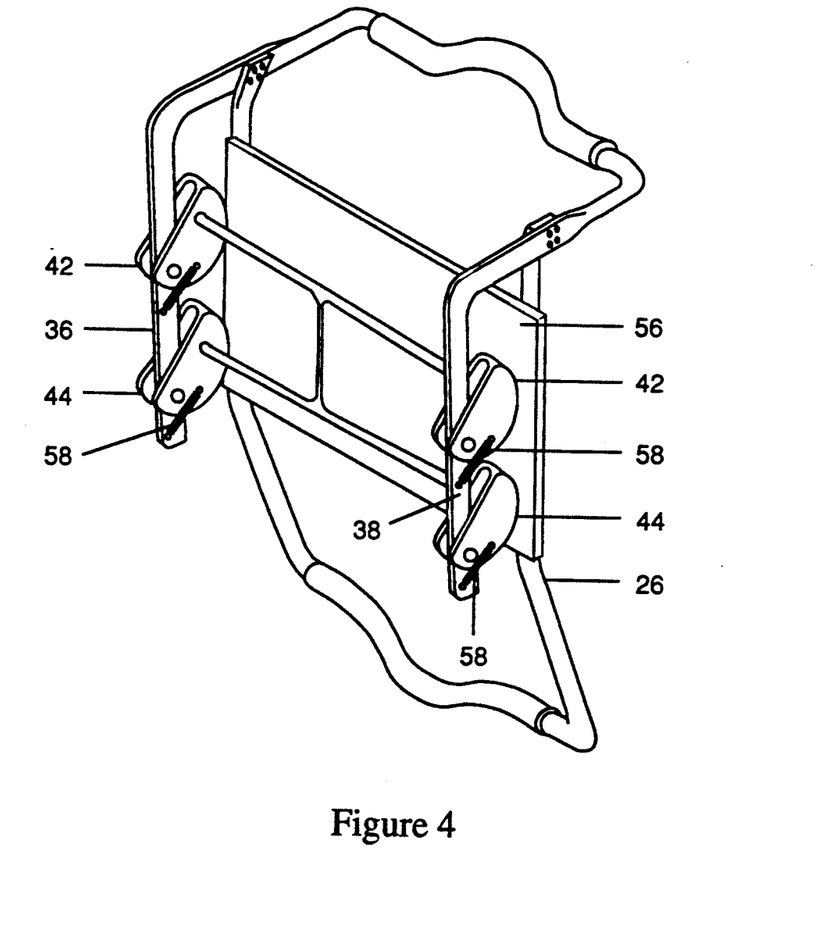
FIG. 4 is an alternative embodiment of the inventive sheet carrying device.

Referring to FIG. 4, an alternative embodiment of the inventive sheet carrying device is shown. In this embodiment, a planar member 56 is disposed in the plane defined by the lower frame portion 26 against which a sheet of material may be placed. This planar member 56 has a sheet contacting surface which is effective for contacting with the surface of the sheet placed in the plane. In this way, the surface contact area is greatly increased between the lower frame portion 26 and the sheet of material. Thus, a more effective grip of the sheet may be obtained. Also, the planar member 56 adds stability and rigidity to the inventive sheet carrying device. Furthermore, the planar member 56 may have a sheet contacting surface made from a grip enhancing material such as rubber or leather to improve the grip of the inventive sheet carrying device on a sheet of material having a smooth surface (such as glass). Furthermore, the gripping means may also include biasing means for biasing each cam in the same direction of rotation as when being rotated due to the gravitational forces exerted on the sheet of material as the frame is lifted upwardly. In other words, springs 58 may be attached between the mounting arms 36 and 38 and each respective cam which are effective for urging the cams 42 and 44 in a direction of rotation which places the contacting surface of the cam securely against the surface of the sheet of material. In this way, the sheet of material is less likely to slip from position before the gravitational forces cause adequate rotation of the cam to provide effective gripping.

Figure 5:
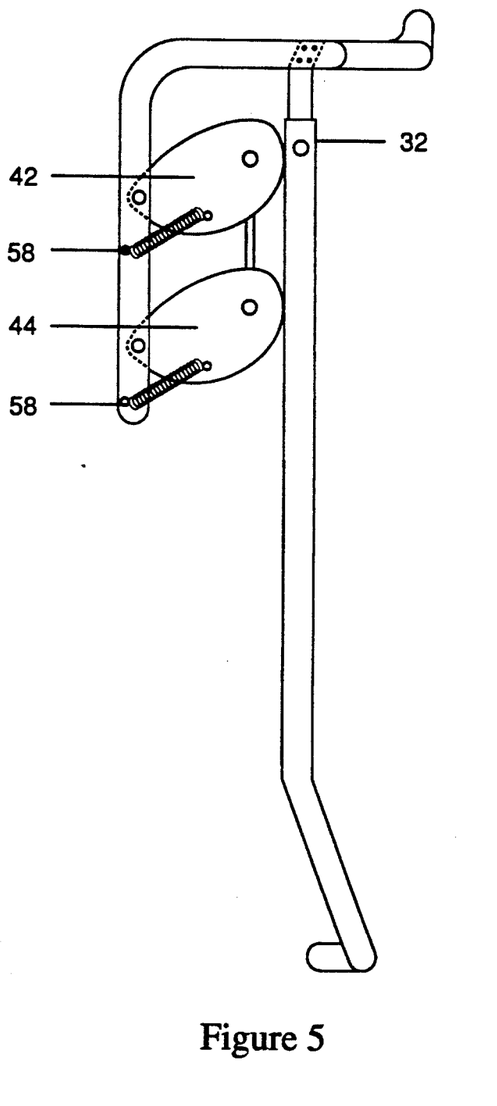
FIG. 5 is a side view of the inventive sheet carrying device.

Referring to FIG. 5, a side view of the inventive sheet carrying device is shown. The biasing means includes springs 58 which pull against the cams 42 and 44 to bias them in a direction of rotation which places the cams 42 and 44 against the surface of a sheet inserted between the cams 42 and 44 and the extendable arms 32 and 34. In this case, the cams 42 and 44 contact with the extendable arm and are prevented from further rotation when a sheet is not disposed therebetween. If the planar member 56 is disposed in the plane as shown in FIG. 4, then the cams 42 and 44 will contact with the planar member 56 being urged by the biasing means. With respect to the above description, it is realized that the optimum dimensional relationships for parts of the invention, including variations in size, materials, shape, form, function, and manner of operation, assembly and use, are deemed readily apparent and obvious to one skilled in the art. All equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention.

We claim:

1. An improved carrying device for carrying sheets of material, comprising: a frame including a lower frame portion comprising a pair of spaced apart frame members against which a sheet of material may be placed, the lower frame portion defining a plane at which the sheet of material may be placed, the lower frame portion having a lower crossbar forming a lower lifting region, and an upper frame portion joined to the lower frame portion, having a pair of mounting arms disposed opposite the plane at which the sheet of material may be placed and having an upper crossbar forming an upper lifting region, the upper and lower crossbars being offset from the plane at which the sheet of material may be placed on one side thereof; gripping means for gripping a sheet of material comprising at least two pairs of cams pivotally supported on the mounting arms and effective to engage with a sheet of material placed at the plane at which the sheet of material may be placed and effective to rotate into tighter gripping engagement with the sheet of material by gravitational forces exerted on the sheet of material as the frame is lifted upwardly; and a stabilizing planar member disposed adjacent to the plane at which the sheet of material may be placed, fixed to and rigidly connecting the pair of spaced apart frame members and disposed opposite the mounting arms, and having a sheet contacting surface having a length at least as long as a distance between the mounting arms effective for contacting with the surface of the sheet and providing a large surface area for enhancing the grip of the gripping means.

2. An improved carrying device according to claim 1; wherein the lower crossbar forming the lower lifting region defines a curve effective for accommodating a leg of a user during use of the carrying device.

3. An improved carrying device according to claim 1; wherein the upper crossbar forming the upper lifting region defines a curve effective for accommodating a shoulder of a user during use of the carrying device.

4. An improved carrying device according to claim 1; wherein the lower frame portion includes a pair of extendable arms effective for varying the distance between the upper lifting region and the lower lifting region.

5. An improved carrying device according to claim 1; further comprising a strap member attached to the upper frame portion and effective for supporting the carrying device around the torso of a user during use of the carrying device.

6. An improved carrying device according to claim 1; wherein the gripping means further includes biasing means for biasing each cam in the same direction of rotation as when being rotated due to gravitational forces exerted on the sheet of material as the frame is lifted upwardly.

7. An improved device according to claim 1; wherein the gripping means further comprises a connecting member connecting each pair of cams for tandem motion.

8. An improved carrying device according to claim 7; wherein the gripping means further comprises a tie-bar joining each connecting member and effective to promote tandem motion of all the cams.

9. An improved carrying device according to claim 1; wherein the sheet contacting surface of the stabilizing planar member comprises at least one of leather, rubber and a polymer.

10. An improved carrying device for carrying sheets of material, comprising: a frame including a lower frame portion comprising a pair of spaced apart frame members against which a sheet of material may be placed, the lower frame portion defining a plane at which the sheet of material may be placed, the lower frame portion having a lower crossbar forming a lower lifting region, the crossbar defining a curve effective for accommodating a leg of a user during use of the carrying device, and an upper frame portion joined to the lower frame portion, having a pair of mounting arms disposed opposite the plane and having an upper crossbar forming an upper lifting region, the upper and lower crossbars being offset from the lower frame portion on one side thereof; and gripping means for gripping a sheet of material comprising at least two pairs of cams pivotally supported on the mounting arms and effective to engage with a sheet of material placed against the plane and effective to rotate into tighter gripping engagement with the sheet of material by gravitational forces exerted on the sheet of material as the frame is lifted upwardly, and a connecting member connecting each pair of cams for tandem motion.

11. An improved carrying device according to claim 10; wherein the upper crossbar forming the upper lifting region defines a curve effective for accommodating a shoulder of a user during use of the carrying device.

12. An improved carrying device according to claim 10; wherein the lower frame portion includes a pair of extendable arms effective for varying the distance between the upper lifting region and the lower lifting region.

13. An improved carrying device according to claim 10; further comprising a strap member attached to the upper frame portion and effective for supporting the carrying device around the torso of a user during use of the carrying device.

14. An improved carrying device according to claim 10; wherein the gripping means further comprises a tie-bar joining each connecting member and effective to promote tandem motion of all the cams.

15. An improved carrying device according to claim 10; further comprising a stabilizing planar member disposed adjacent to the plane at which the sheet of material may be placed, fixed to and rigidly connecting the pair of spaced apart frame members and disposed opposite the mounting arms, and having a sheet contacting surface, comprising at least one of leather, rubber and a polymer, and having a length at least as long as a distance between the mounting arms effective for contacting with the surface of the sheet and providing a large surface area for enhancing the grip of the gripping means.

16. An improved carrying device for carrying sheets of material, comprising: a frame including a lower frame portion comprising a pair of spaced apart frame members against which a sheet of material may be placed, the lower frame portion defining a plane at which the sheet of material may be placed, the lower frame portion having a lower crossbar forming a lower lifting region defining a curve for accommodating the leg of a user, and an upper frame portion joined to the lower frame portion and defining a curve for accommodating the shoulder of a user, having a pair of mounting arms disposed opposite the plane at which the sheet of material may be placed and having an upper crossbar forming an upper lifting region, the upper and lower crossbars being offset from the plane at which the sheet of material may be placed on one side thereof; and gripping means for gripping a sheet of material comprising at least one pair of cams pivotally supported on the mounting arms and effective to engage with a sheet of material placed at the plane at which the sheet of material may be placed and effective to rotate into tighter gripping engagement with the sheet of material by gravitational forces exerted on the sheet of material as the frame is lifted upwardly, the gripping means also comprising a connecting member connecting each pair of cams for tandem motion.

17. An improved sheet carrying device according to claim 16; further comprising a stabilizing planar member disposed adjacent to the plane at which the sheet of material may be placed, fixed to and rigidly connecting the pair of spaced apart frame members and disposed opposite the mounting arms, and having a sheet contacting surface having a length at least as long as a distance between the mounting arms effective for contacting with the surface of the sheet and providing a large surface area for enhancing the grip of the gripping means.

18. An improved carrying device according to claim 17; wherein the sheet contacting surface of the stabilizing planar member comprises at least one of leather, rubber and a polymer.

19. An improved carrying device according to claim 16; wherein the at least one pair of cams comprises two or more pairs of cams and the gripping means further comprises a tie-bar joining each connecting member and effective to promote tandem motion of all the cams.

* * * * *